United States Patent [19]

Howerton

[11] Patent Number: 5,058,980
[45] Date of Patent: Oct. 22, 1991

[54] MULTIMODE OPTICAL FIBER INTERCONNECT FOR PUMPING ND:YAG ROD WITH SEMICONDUCTOR LASERS

[75] Inventor: Phillip H. Howerton, Bowie, Md.
[73] Assignee: SFA, Inc., Landover, Md.
[21] Appl. No.: 482,778
[22] Filed: Feb. 21, 1990
[51] Int. Cl.$^5$ .............................................. G02B 6/26
[52] U.S. Cl. ....................................... 385/31; 372/70
[58] Field of Search .................... 350/96.15; 372/6, 69, 372/70

[56] References Cited

U.S. PATENT DOCUMENTS

| | | | |
|---|---|---|---|
| 4,383,318 | 5/1983 | Barry et al. | 372/70 X |
| 4,546,476 | 10/1985 | Shaw et al. | 372/6 |
| 4,763,975 | 8/1988 | Scifres et al. | 350/96.18 X |
| 4,818,062 | 4/1989 | Scifres et al. | 350/96.15 X |
| 4,820,010 | 4/1989 | Scifres et al. | 350/96.15 |
| 4,945,544 | 7/1990 | Tanaka et al. | 372/70 |
| 4,952,892 | 8/1990 | Kronberg | 350/96.15 |

OTHER PUBLICATIONS

T. Y. Fan et al, IEE Journal of Quantum Electronics, vol. 24, No. 6, Jun. 1988—"Diode Laser-Pumped Solid-State Lasers", pp. 895 to 912.
Wm. Striefer et al, IEE Journal of Quantum Electronics, vol. 24, No. 6, Jun. 1988, "Advances in Diode Laser Pumps"—pp. 883 to 894.
D. L. Sipes, Jet Propulsion Laboratory, California Institute of Technology, Pasadena, Calif. 91109, Appl. Phys. Lett. 47 (2), Jul. 15, 1985, pp. 74 to 76.
J. Berger et al, 370 mW, 1:06 m, CW Tem. Output from an Nd: Yag Laser Rod End-Pumped by a Monolithic Diode Array, Apr. 13, 1987, Specta Diode Laboratories, 3333 N. First St., San Jose, CA 95134.
F. Hanson et al, Laser Diode Side Pumping of Neodymium Laser Rods, Applied Optics/vol. 27, No. 1, Jan. 1, 1988, pp. 80 to 83.
R. Burnham et al, High-Power Diode-Array-Pumped Frequency-Doubled CW Nd:YAG Laser, Jan. 1, 1989, vol. 14, No. 1, Optics Letters, 1989 Optical Society of America, pp. 27 to 29.
J. Berger et al, Fiber-Bundle Coupled, Diode End-Pumped Nd: YAG Laser, Optics Letters, vol. 13, No. 4, Apr. 1988, 1988, Optical Society of America, pp. 306 to 308.
F. A. Jenkins and H. E. Whute, Fundamentals of Optics, Lens Aberrations p. 175.
I. N. Duling, et al, High-Power, Mode-Locked Nd:Fibre Laser Pumped by an Injection-Locked Diode Array, Electronics Letters, Oct. 13, 1988, vol. 24, No. 21, pp. 1333 to 1335.

Primary Examiner—John D. Lee
Assistant Examiner—Phan T. Heartney
Attorney, Agent, or Firm—Foley & Lardner, Schwartz, Jeffery, Schwaab, Mack, Blumenthal & Evans

[57] ABSTRACT

Light energy is efficiently coupled into a laser rod in a direction parallel to a resonating mode of the rod through optical fibers. Individual optical fibers having a refractive index lower than the refractive index of the laser rod are placed side by side around a barrel portion of a laser rod, parallel to the direction of the resonating mode, with the core portions of the optical fibers exposed by stripping the cladding. Since the law of total internal reflection for the light in the fibers is violated when the light encounters the higher refractive index of the laser rod, the exposed cores contacting the laser rod couple light energy injected into ends of the fibers to the laser rod. A reflector at end of the fibers opposite the light injection allows uncoupled light energy to be coupled into the laser rod on a second pass.

25 Claims, 4 Drawing Sheets

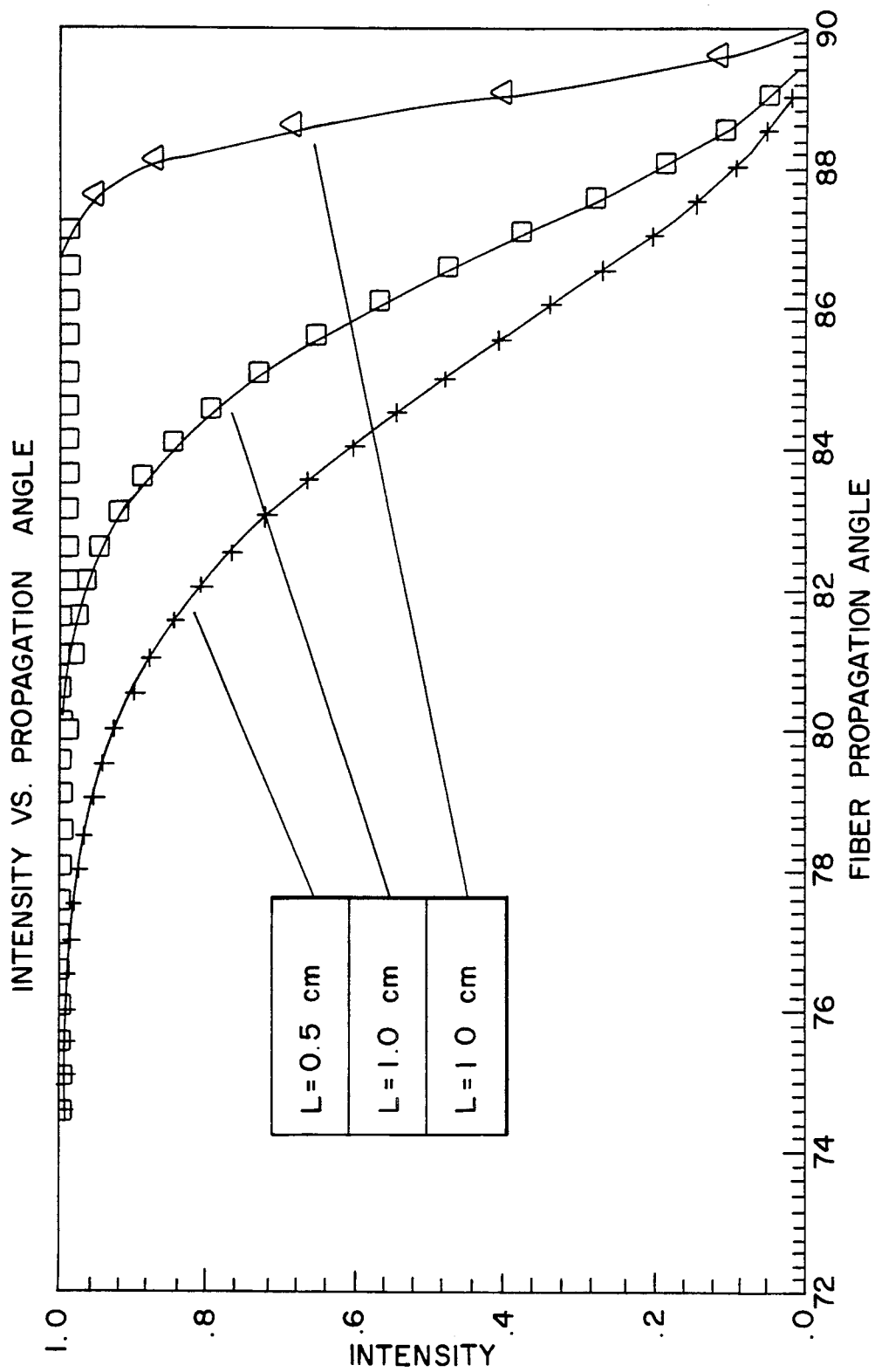

MULTIMODE OPTICAL FIBER INTERCONNECT FOR PUMPING ND:YAG ROD WITH SEMICONDUCTOR LASERS

BACKGROUND OF THE INVENTION

1. Field of the Art

The invention is related to optical systems using lasers and specifically to systems coupling light energy to laser rods.

2. Related Art

Solid state lasers have gained wide use in the fields of manufacturing, medicine, defense and scientific research. In most cases, these lasers are formed by directing light from a high-pressure arc or flashlamp into a host material containing a transition element of a rare earth element. A mirror is placed at each end of a laser material to form a resonant cavity—one mirror is highly reflective the other is partially reflective. Arc lamps and flashlamps emit their energy over a relatively broad spectrum, whereas the absorption spectrum of the solid state laser material may be quite narrow. Neodymium doped yttrium aluminum garnet (Nd:YAG) crystal, for example, has large absorption peaks centered at wavelengths 750 and 810 nm which have a full width half maximum (FWHM), the width measured at half the maximum of the pulse, of only a few nanometers. A large portion of the lamp's output spectrum is therefore unusable by the laser material, and is transformed into undesirable thermal energy which significantly reduces overall efficiency of the laser system.

As alternative pumping sources to arc lamps or flashlamps, laser diodes offer more efficient absorption of their output energy by the solid state laser material. The output spectrum of a laser diode can be temperature-tuned over several nanometers and is sufficiently narrow as to optimize absorption. As disclosed by T. Y. Fun & R. L. Byer in "Diode Laser-Pumped Solid-State Laser" IEEE-IQE Vol. 24, No. 6, June 1988, and by N. Streifer, D. P. Scifies, G. L. Harnagel, D. F. Welch, J. Berger & M. Sakamoto in "Advances in Diode Laser Pumps", IEEE JQE Vol. 24, No. 6, June, 1988, the development of efficient and reliable high power laser diode arrays, makes the construction of compact solid state lasers possible.

Two basic methods exist for coupling the emission of a laser diode array to a solid state laser material. The first is end pumping, where a diode's emission is collected and focused by optical elements into a laser rod end face. End pumping is disclosed by D.L. Spies in "Highly Efficient Nd:YAG Laser End Pumped Semiconductor Laser Array" Appl. Physics Letters Vol. 47, pp. 74–76, 1985 and by J. Berger, D.F. Welch, D.R. Scifres, W. Streifer and P.S. Crossing in "370 mw, 1.06μm CW TEMoo Output from an Nd:YAG Laser Rod End Pumped by a Monolithic Diode Array", Electronics Letters, Vol. 23, pp. 669–670, 1987. The second method, side pumping, uses laser diodes to illuminate the side or barrel portion of a laser rod. Side pumping is disclosed by Filtanson and D. Haddock in "Laser Diode Side Pumping of Neodymium Laser Rods", Applied Optics, Vol. 27, No. 1, 1 Jan. 88 and R. Burnham and A. D. Hays "High Powered Diode Array Pumped Frequency Doubled CW Nd:YAG Laser", Optics Letters, Vol. 14, No. 1, 1 Jan. 1988.

In the end-pumped configuration, the end face of the laser rod adjacent to the laser diode is coated with a dielectric to maximize both transmission of the laser pump wavelength and reflection of the lasing wavelength. The resonating cavity is completed by placing a partially reflecting mirror parallel to the opposite end face. Because the diode emission is tightly focused down the center of the laser rod, there is high overlap between the laser resonating mode and the pumped volume of active material. Low lasing thresholds can be obtained with this configuration because energy is not wasted pumping portions of the rod outside the lasing volume. End-pumped solid state lasers are, however, limited in maximum output power by the energy available from the diode pump source placed at the focal point of the collecting optics. Additional optical elements can be added to combine the outputs of multiple diode laser in order to increase pump power. Unfortunately, this adds both to the cost and complexity of the laser system.

A variation on the end-pumped configuration uses an optical fiber bundle to couple light from laser diode arrays to the solid state laser rod as disclosed by J. Berger, D. F. Welch, W. Streifer, D. R. Scifres, N. J. Hoaman, J. J. Smith, and D. Rodecki in "Fiber-Bundle Coupled Diode End Pumped Nd:YAG Laser" in Optics Letters, Vol. 13, No. 4, Apr. 1988. The fiber bundle terminates in the end-pumped configuration. To efficiently couple pump energy into the laser material through an imaging element, the diameter of the fiber bundle (i.e., image size) must satisfy the Lagrange invariant, as disclosed by F. A. Janks & H. E. White in *Fundamentals of Optics*, at page 175, McGraw Hill, 1976. This means that a small fiber bundle diameter is required to achieve tight focus into the rod's center. This requirement limits the number and size of individual fibers that can be placed at the focal point of the input optical element.

In the side-pumped configuration, laser diodes are placed perpendicular to the direction of propagation of the laser resonator mode along the polished barrel of a laser rod. The remaining portion of the barrel may be coated with material which is highly reflective at the pump wavelength. Mirrors are placed at the two end faces of the laser rod in a fashion similar to a flashlamp-pumped laser. Unlike the end-pumped configuration, multiple diode arrays can be easily placed around the perimeter of the laser rod in order to achieve higher output power. Because the pump light traverses the rod radially, the interaction length is short. Typical laser rod diameters range from 2 to 4 mm. Tight control over the laser diode's output wavelength is therefore necessary to optimize absorption. In addition, the volume occupied by the resonating optical mode can be significantly less than the volume pumped by the diode, resulting in poor mode overlap efficiency.

A technology related to this invention involves fiber optic lasers and fiber optic amplifiers. Fiber optic lasers are formed by doping single mode glass fibers with a rare earth element such as neodymium, holmium, or erbium. The resonator configuration as disclosed by I. N. Duling, L. Goldberg, and J. F. Weller in "High-Power, Mode-locked Nd Fiber Laser Pumped By An Injection-Locked Diode Array" in Electronics Letters, Vol. 24, No. 21, pp. 1333–1334, Oct. 1988, is nearly identical to the end-pumped solid state laser previously described. The main difference is that light is confined to the fiber's core region by total internal reflection, which does not occur in the end-pumped configuration. The advantage of this design is that the high pump- /resonating mode overlap yields extremely low laser thresholds. However, because the core diameter of these fibers is quite small it is difficult to efficiently couple in the pump energy.

A fiber optic amplifier disclosed in U.S. Pat. No. 4,546,476 to Shay and Choderew, consists of a pair of side-by-side multimode optical fibers. The first fiber, which is made of quartz, is used to supply pump energy to a second fiber made from Nd-doped YAG crystal. The signal to be amplified propagating in the second fiber stimulates the emission of coherent radiation in the Nd:YAG material. The advantage of this design is that the pump energy in the quartz fiber efficiently couples to the Nd:YAG fiber which allows for in-line amplification of the input signal.

SUMMARY OF THE INVENTION

In view of the above limitations of the related art, it is an object of the invention to provide a means for coupling light into solid state laser material without the disadvantages of the side and end pumped laser configurations.

It is another object of the invention to place multiple fibers with additional pump sources side by side around the perimeter of a laser rod to increase pump energy.

It is a further object of the invention to combine the use of such multiple fibers with a long laser rod so that very high pump levels can be achieved.

It is another object of the invention that both ends of a laser rod be available for output coupling or Q-switch placement.

It is another object of the invention to make long interaction lengths possible because the pump light follows a zig-zag path in the laser rod, permitting nearly 100% pump light absorption.

It is still another object of the invention to provide long interaction lengths to loosen the wavelength stability tolerance of the laser diodes, thereby lowering the diode cost and temperature stability requirements.

It is still another object of the invention to select laser rod diameters that optimize pump volume/resonating mode overlap, thus lowering laser threshold.

It is another object of the invention to improve reliability through the redundancy of optical fibers and laser diodes.

The above objects of the invention are accomplished by a novel arrangement of multimode optical fibers that couple light from a pump source (typically laser diodes or diode arrays) to a solid state laser material. Individual optical fibers are placed side-by-side around a barrel portion of a laser rod, parallel to the direction of the resonating mode. Both the jacket and cladding materials are removed from the section of the optical fibers in contact with the laser rod, either by chemical techniques such as etching or by mechanical techniques such as stripping or polishing. A thin layer of refractive index-matching optical adhesive is used to attach the bare portion of the fibers to the laser rod. Finally, a low refractive index protective coating is applied to the fiber-rod assembly for strain relief and hermetic sealing.

The refractive index of the core region of the optical fibers is chosen to be lower than the laser rod refractive index. The refractive index of the optical adhesive is chosen to lie between that of the fiber cores and the laser material. The refractive index of the protective coating is chosen to either match or be slightly less than the refractive index of the cladding portion of the fibers. Light entering the fibers from the pump sources is guided to the laser material by total internal reflection. When the light reaches the stripped portion of the optical fibers, it encounters the higher indices of the adhesive and laser material, thus violating the rule of total internal reflection for light in the fiber cores. Light therefore leaks from the fiber cores into the laser material. Because the laser rod is surrounded by low refractive index material, total internal reflection will occur within the laser rod. A reflector made from silver-doped epoxy is placed on the far end of the fibers, thereby allowing any uncoupled light to reflect back and couple into the laser rod on a second pass past the stripped portion. A second arrangement involves placing a second laser array at the far end of the fibers instead of the silver-doped epoxy. The only modification required of the above design would be to simply increase the length in which the fibers and laser rod are in contact.

BRIEF DESCRIPTION OF THE DRAWINGS

The invention will be described with particularity in accordance with the following figures in which:

FIg. 4 shows the calculated laser rod output light intensity as a function of the propagation angle of light in the optical fiber and the interaction length between the fiber and the laser rod.

DETAILED DESCRIPTION OF THE PREFERRED EMBODIMENTS

By way of example and not as a limitation, this description of the invention assumes the use of a particular solid state material (Nd:YAG). It is understood that the invention is equally applicable to other solid state materials used in laser and fiber optic applications. In addition, the calculations presented are based on ray optic theory, as opposed to wave optic theory. Ray optic theory is well suited to the large fiber and laser rod geometries utilized and facilitates an intuitive description of the optical system.

Figure 1:
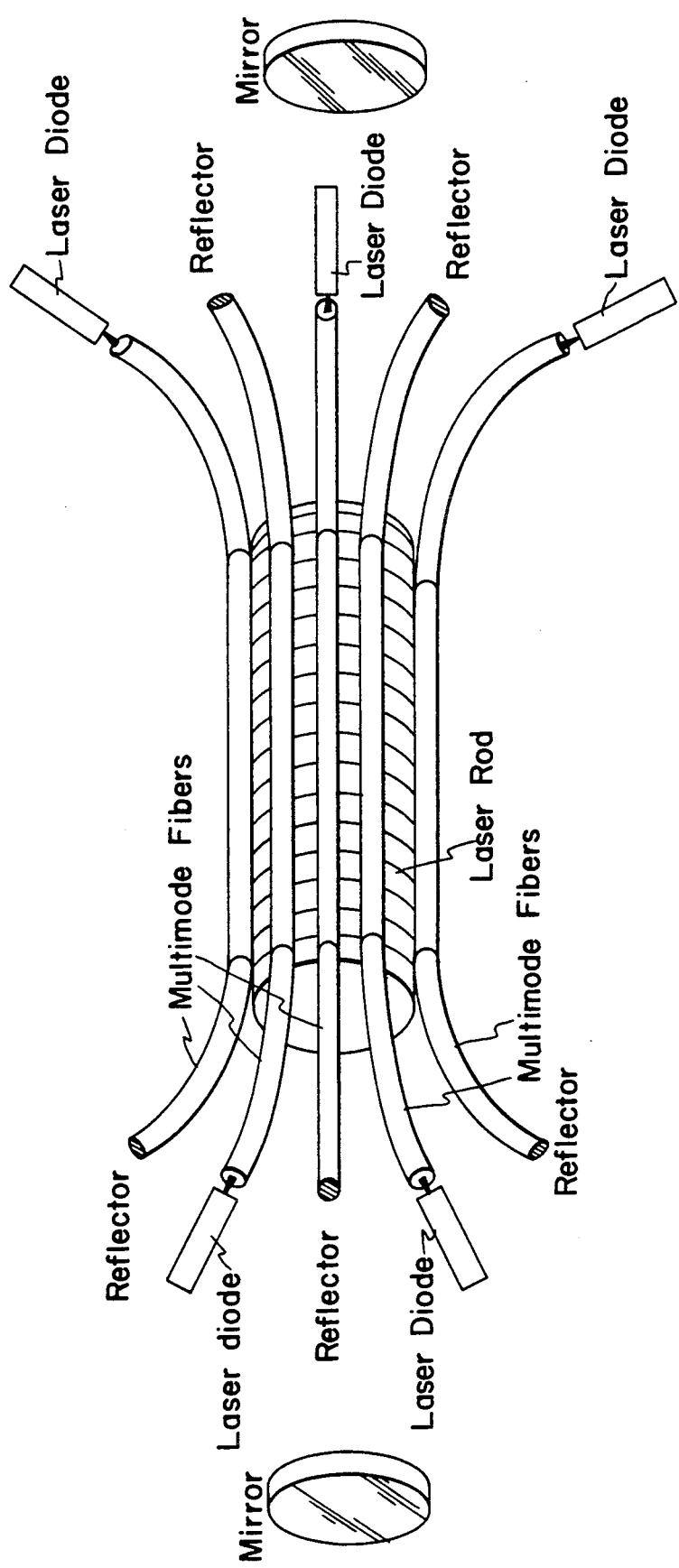
FIG. 1 shows an optical resonator with an arrangement of multimode fibers around a perimeter of a laser rod and the location of laser diodes, fiber reflectors, and laser cavity mirrors.
Figure 2:
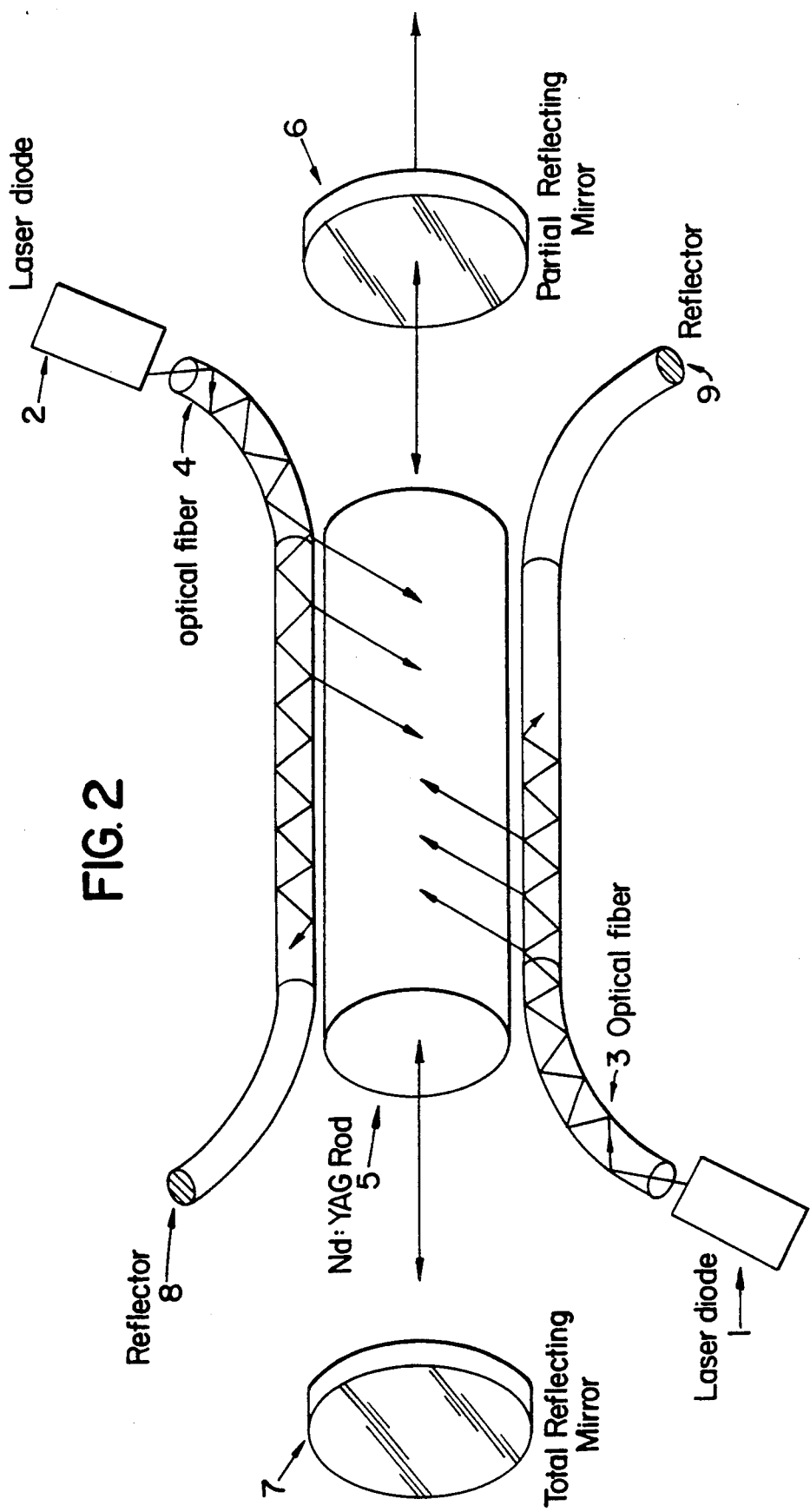
FIG. 2 is a simplified view of the optical resonator in FIG. 1, showing only two optical fibers and indicating a typical path that a light ray may take after entering a fiber.

Referring to FIG. 2, an optical resonator is formed in which laser diode arrays 1,2 are attached to multimode optical fibers 3,4. Additional fibers and lasers would normally be placed arouund the laser rod, as shown in FIG. 1. These additional fibers have been omitted from the simplified view in FIG. 2 for illustration purposes. A typical fiber which can be used is plastic-clad silica with a core index of $n1 = 1.458$ and a cladding index $n2 = 1.405$. Plastic-clad silica fiber is particularly desirable because of its easily accessible core region and its high numerical aperture. The core diameter of the multimode fiber is not critical; however, it should be large enough to allow efficient coupling of energy from the laser arrays 1,2. A 1 to 3 cm portion of the fiber jacket and cladding material is removed, thereby exposing the core region of the fiber. A high quality optical adhesive having a refractive index $n3$ between that of the fiber core and the Nd:YAG rod 5 (n4=1.8) is used to attach the fibers to the laser rod.

The diameter of the Nd:YAG rod 5 is selected to be slightly larger than the largest portion of the beam diameter in the optical resonator. Efficiency can be achieved by making the rod diameter approximately the size of the diameter in which the lasing mode occurs. This, of course, is dependent on the type and length of optical resonator used (confocal, hemiconfocal, etc., depending on the type of mirrors used) and the chosen longitudinal mode order. Typical diameters range from 0.5 to 3mm. A partially reflecting mirror 6 and a total reflecting mirror 7 are placed at the ends of the laser rod. Silver-doped epoxy reflectors 8,9 are placed on the far ends of the optical fibers.

Figure 3:
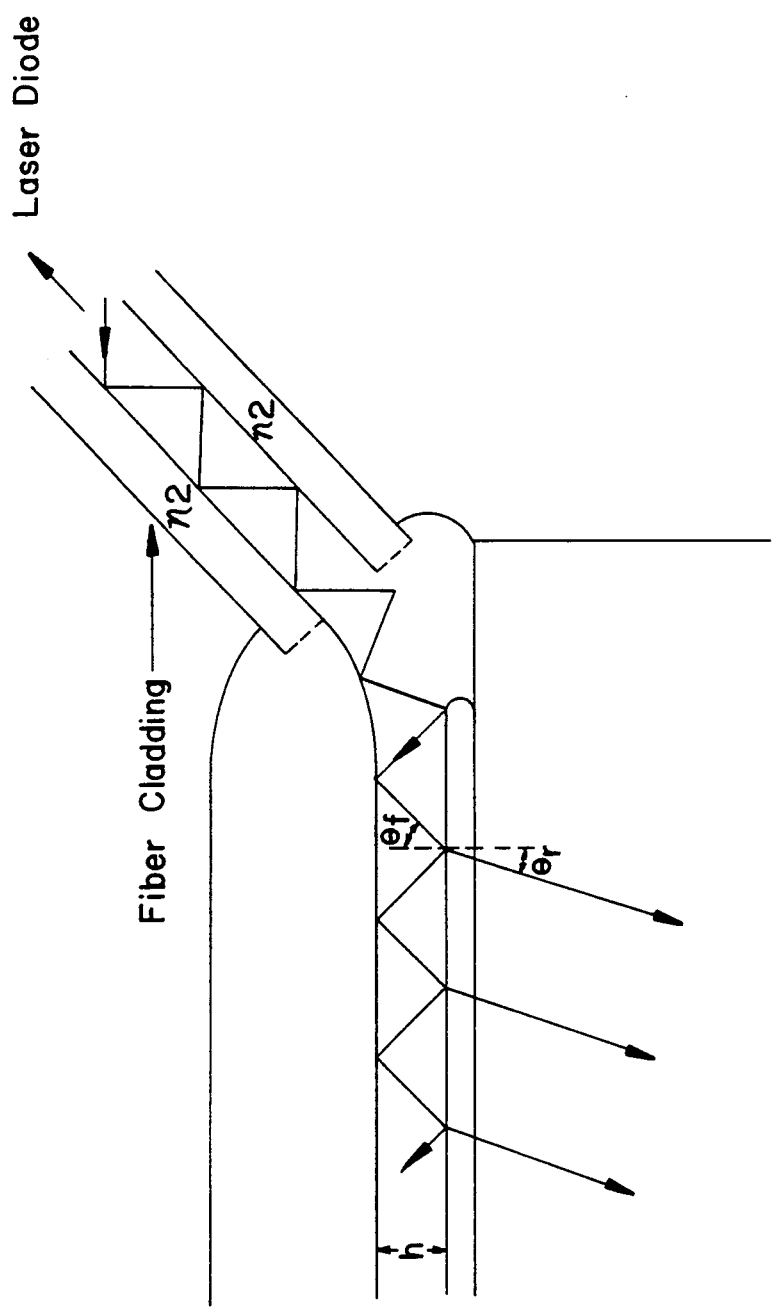
FIg. 3 is a detailed view of a region through which a light ray transmits in passing from the optical fiber to a laser rod.

As shown in FIG. 3, when light in the fiber transmits from the clad to the unclad region attached to Nd:YAG rod 5, both reflection and refraction occur. The angle of refraction is obtained by solving Snell's law:

$$\Theta_r = \sin^{-1}\left(\left(\frac{n1}{n4}\right)\sin \Theta_f\right) \tag{1}$$

where $\Theta_f$, also illustrated in FIG. 3, is an allowed angle of propagation in the fiber. $\Theta_f$ is therefore also the incident angle in determining the coefficient of reflection for transverse electric and transverse magnetic polarizations by the Fresnel equations $$R_{TM} = \left[\frac{\frac{n1}{n4}\cos\Theta_f - \cos\Theta_r}{\frac{n1}{n4}\cos\Theta_f + \cos\Theta_r}\right]^2 \tag{2}$$

$$R_{TE} = \left[\frac{-\cos\Theta_f + \frac{n1}{n4}\cos\Theta_r}{\cos\Theta_f + \frac{n1}{n4}\cos\Theta_r}\right]^2$$

Here $\Theta_f$ and $\Theta_r$ are the incident and transmitted angles, respectively, measured from a vertical axis. Because the multimode fiber is not polarization-preserving, the reflection coefficient R is taken as an average of the transverse electric and magnetic coefficients. It should be noted that the fiber mode propagation angle in the region where the fiber and laser rod are in contact is slightly different from the angle in the uncontacted region, but for simplicity they are considered to be about the same. In addition, the thin layer of optical adhesive can be neglected and only those rays that lie in the plane containing both the center of the fiber and laser rod are considered. As a first approximation, these assumptions are acceptable.

Continuing refraction and reflection events occur as light propagates along the fiber. Each time this occurs, a portion of the original light energy couples to the Nd:YAG rod 5. Light from the fiber enters the laser rod at an oblique angle relative to the vertical axis through the rod to achieve approximately total internal reflection. The light intensity at the far end of the laser rod is given by $$I = I_0(1 - R^N) \tag{3}$$

where N is the number of reflection and refraction events in the region where the fiber is attached to the rod and $I_0$ is the initial light intensity. N is related to the overall Nd:YAG rod-fiber interaction length L by the relation $$N = \frac{L}{2h \tan \Theta_f} \tag{4}$$

where h is the fiber diameter.

As light couples from a laser diode into the high numerical aperture fiber, a large number of discrete optical modes are excited. The total number of modes can be estimated from the relation $$M = \frac{2\Pi^2 a^2}{\lambda^2}(N_1^2 - N_2^2) \tag{5}$$

where a is the fiber radius and $\lambda$ is the pump wavelength. For example, a plastic-clad silica fiber with a core diameter of 100 μm and a pump wavelength of 810 nm has more than 11,000 possible longitudinal modes. Fortunately, it is not necessary to solve the dispersion relation for every allowable mode in order to find the propagation angles. We are only interested in the range of allowable propagation angles in the multimode fiber. From Snell's law the smallest angle that supports total internal reflection for the meridional ray, is $\Theta_{min}$, given by $$\Theta_{min} = \sin^{-1}\left(\frac{n2}{n1}\right) \tag{6}$$

where $\Theta_{min}$ is measured from the vertical. This corresponds to the highest order longitudinal mode. The lowest order mode corresponds to a 90 degree propagation angle.

FIG. 4 shows the solution of equations 3 and 4 over the range of allowable propagation angles for various laser rod lengths. As one would expect, a longer fiber-rod interaction length results in increased coupling to the Nd:YAG rod 5. Thus, the length of the laser rod can be selected to optimize coupling. More importantly, FIG. 4 shows that most of the energy contained in the lower order modes, even for relatively long interaction lengths, does not couple efficiently to the laser rod. This is significant because laser diodes tend to fully populate the lower order fiber modes, which carry a large portion of the output energy of the laser diode.

An innovative solution involves beveling the end face of the fiber opposite the end to which the laser is attached, and then coating it with a reflective material such as silver-doped epoxy. As low order modes from within the fiber strike the beveled end face, they are reflected and counterpropagate as higher order modes. The energy found in lower order modes is, therefore, recovered upon a second pass of the energy through the fiber by the laser rod. The angle or tilt of the fiber end face is somewhat arbitrary, although it should be less than $(90 - \Theta_{min})/2$, relative to a perpendicular end face. In practice, a bevel of several degrees is easily obtained by simply scribing and breaking the fiber. Silver-doped epoxy is particularly well suited as a reflector because the silver particles introduce a small amount of scattering which also increases the propagation angle of the reflected ray.

Although the present invention has been described with reference to the several preferred embodiments thereof, it will be understood that it is not limited to these particular embodiments and various other changes and modifications can be made within the spirit and scope of the invention, including the selection of laser materials and the particular frequencies of operation.

What is claimed is:

1. A method of coupling light energy to a laser rod comprising the steps of:
   contacting the laser rod in a direction parallel to a resonating mode of the rod with a core portion of at least one section of a multimode fiber, the section being stripped of a cladding of the fiber to exposed the core; and
   injecting light energy into at least one of two ends of the fiber thereby propagating light through the fiber and coupling at least a portion of the light energy to the laser rod through the exposed core of the section.

2. The method recited in claim 1 wherein the laser rod is contacted with a plurality of sections of multimode fiber, each section being stripped of a cladding to expose a core portion of the fiber in a region contacting the laser rod; and
   light energy is injected into each of the fibers.

3. The method recited in claim 1 wherein light energy is injected into the one end of the fiber and reflected at the other end of the fiber with a reflecting coating.

4. The method recited in claim 3 further comprising the step of:
   reflecting lower order light propagation modes through a fiber having a beveled face on said other end.

5. The method recited in claim 4 wherein the step of reflecting light energy through the fiber with a beveled face further comprises reflecting light energy through an end face angle of less than one half a difference between 90° and a smallest angle supporting total internal reflection for a meridional ray.

6. The method recited in claim 3 wherein the step of reflecting light energy with a reflective coating further comprises reflecting the light energy with a coating of silver doped epoxy.

7. The method recited in claim 1 wherein the step of injecting light energy into the fiber comprises coupling light energy from a laser diode into the fiber.

8. The method recited in claim 2 wherein each fiber is attached to one of a plurality of laser diodes in an array.

9. An apparatus for coupling light energy into a laser rod comprising:
   a laser rod;
   at least one multimode optical fiber having a core portion surrounded by a cladding, a section of the fiber having the cladding stripped off to expose the core portion, the exposed portion of the core being disposed to contact the laser rod in a direction parallel to a direction of resonance in the laser rod;
   means for injecting light energy into at least one end of the fiber, thereby propagating light energy through the fiber and coupling the light energy to the laser rod through the exposed core portion.

10. The apparatus recited in claim 9 wherein
    a plurality of fibers, each fiber having a core portion surrounded by a cladding, and each fiber having a section of the cladding stripped off to expose the core, has exposed portions of the cores disposed to contact the laser rod; and
    light energy injecting means injects light energy into each of the fibers.

11. The apparatus recited in claim 10 wherein the means for injecting light energy into the fibers comprises a plurality of laser diodes, each of the laser diodes being coupled to one of the fibers.

12. The apparatus recited in claim 11 wherein the laser diodes are arranged in an array.

13. The apparatus recited in claim 9 wherein the means for injecting light energy into the fiber comprises a laser diode coupled to the fiber.

14. The apparatus recited in claim 9 wherein the laser rod has a diameter larger than a largest portion of a beam diameter in an optical resonator of the laser rod.

15. The apparatus recited in claim 9 wherein the optical fiber core has a lower index of refraction than an index of refraction of the laser rod.

16. The apparatus recited in claim 9 further comprising an optical adhesive disposed between the exposed core and the laser rod.

17. The apparatus rectied in claim 16 wherein the optical adhesive has an index of refraction between an index of refraction of the laser rod and an index of refraction of the core.

18. The apparatus recited in claim 9 wherein light from the fiber enters the laser rod at an oblique angle relative to a vertical axis of the laser rod to achieve approximately total internal reflection of the light energy propagating in the fiber.

19. The apparatus recited in claim 9 wherein the laser rod comprises a Nd:YAG material.

20. The apparatus rectied in claim 9 wherein the optical fiber comprises plastic clad silica fiber.

21. The apparatus of claim 9 wherein the laser rod has a diameter approximately equal to a diameter in which a lasing mode occurs.

22. The apparatus recited in claim 9, wherein the fiber has a beveled face on an end opposite an end of light energy injection, thereby reflecting lower order light propagation modes through the fiber.

23. The apparatus recited in claim 22 wherein the beveled face is at a face angle of less than one half a difference between 90 and a smallest angle supporting total internal reflection for a meridional ray.

24. The apparatus recited in claim 9 further comprising a light energy reflecting coating placed at an end of the fiber opposite an end of light injection.

25. The apparatus recited in claim 24 wherein the reflective coating comprises silver doped epoxy.

* * * * *